(12) United States Patent
Orr et al.

(10) Patent No.: US 8,291,007 B2
(45) Date of Patent: Oct. 16, 2012

(54) SYSTEM AND METHOD TO ACCELERATE CLIENT/SERVER INTERACTIONS USING PREDICTIVE REQUESTS

(75) Inventors: Michael Orr, Ramat Gan (IL); Boaz Av-Ron, Mikve (IL); Udi Segall, Maalot (IL); Yair Shapira, Haifa (IL); Zvi Peled, Cesaria (IL); Yoav Weiss, Tel Aviv (IL); Ariel Shulman, Tel-Aviv (IL); Amnon Siev, Hertzlia (IL)

(73) Assignee: Flash Networks Ltd, Herzliya Petauach (IL)

( * ) Notice: Subject to any disclaimer, the term of this patent is extended or adjusted under 35 U.S.C. 154(b) by 1946 days.

(21) Appl. No.: 09/788,545

(22) Filed: Feb. 21, 2001

(65) Prior Publication Data

US 2002/0023145 A1  Feb. 21, 2002

Related U.S. Application Data

(60) Provisional application No. 60/183,818, filed on Feb. 22, 2000, provisional application No. 60/194,050, filed on Apr. 3, 2000, provisional application No. 60/196,163, filed on Apr. 11, 2000.

(51) Int. Cl.
*G06F 15/16* (2006.01)
(52) U.S. Cl. ......... 709/203; 709/201; 715/234; 715/812
(58) Field of Classification Search .................. 709/201, 709/202, 203, 217, 218, 219, 227, 234, 235; 715/234, 812
See application file for complete search history.

(56) References Cited

U.S. PATENT DOCUMENTS

| | | | | |
|---|---|---|---|---|
| 5,802,292 | A * | 9/1998 | Mogul | 709/203 |
| 5,878,223 | A * | 3/1999 | Becker et al. | 709/223 |
| 5,978,841 | A * | 11/1999 | Berger | 709/217 |
| 6,073,168 | A * | 6/2000 | Mighdoll et al. | 709/217 |
| 6,128,667 | A * | 10/2000 | Jeffrey | 709/245 |
| 6,151,603 | A * | 11/2000 | Wolfe | 707/10 |
| 6,393,526 | B1 * | 5/2002 | Crow et al. | 711/137 |
| 6,463,509 | B1 * | 10/2002 | Teoman et al. | 711/137 |
| 6,510,469 | B1 * | 1/2003 | Starnes et al. | 709/247 |
| 6,721,780 | B1 * | 4/2004 | Kasriel et al. | 709/203 |
| 6,728,726 | B1 * | 4/2004 | Bernstein et al. | 707/103 R |
| 6,807,570 | B1 * | 10/2004 | Allen et al. | 709/219 |

(Continued)

OTHER PUBLICATIONS

Dias G V et al: "A Smart Internet Catching System" Internet Citation, 'Online! Jun. 24, 1996, pp. 1-12, XP002086721. Retrieved from the Internet <URL: http://www.isoc.org/Inet96/proceedings/a4/a4_3.htm> retrieved on Feb. 12, 1998.

(Continued)

*Primary Examiner* — Ramsey Refai
(74) *Attorney, Agent, or Firm* — Smith Risley Tempel Santos LLC; Gregory Scott Smith (57) ABSTRACT

As part of the system and method of the present invention, either a Client Agent and/or a Predictive Server intercept a request from a client to a server, and a response from the server to the client. Based on information derived from the client/server communication, either the Client Agent or the Predictive Server generates a predictive request for data. The server's response to the predictive request is stored at either the Client Agent or the Predictive Server, and is forward to the client when the client generates a request for the data contained in the response.

12 Claims, 7 Drawing Sheets

U.S. PATENT DOCUMENTS 7,047,485 B1 * 5/2006 Klein et al. .................. 715/513

OTHER PUBLICATIONS

Yui-Wen Horng et al: "Hybrid prefetchIng for WWW proxy servers". Parallel and Distributed Systems, 1998. Proceedings. 1998 International Conference on Tainan, Taiwan Dec. 14-16, 1998, Los Alamitos, CA, USA, IEEE Comput. Soc, US, Dec. 14, 1998, pp. 541-548, XP010318668 ISBN: 0-8186-8603-0.

Chinen K-I et al: "Design and Umplementation of a Hybrid Prefetching Proxy Server for WWW" Systems & Computers in Japan, Scripta Technica Journals. New York, US, vol. 29, No. 12, Nov. 15, 1998, pp. 57-65, XP000821934. ISSN: 0882-1666.
Padmanabhan V N et al: "Using Predictive Prefetching to Improve World Wide Web Latency" Computer Communication Review, Association for Computing Machinery. New York, US, vol. 26, No. 3, Jul. 1, 1996, pp. 22-36, XP000607179, ISSN: 0146-4833.
European Search Report taken from EP 01908080.

* cited by examiner

```html
<html><head><title>WOW</title>
<meta charset="visual">
<script language="JavaScript" src="../shared/script.js"></script>
<link id="LinkStyle" rel="stylesheet" href="../css/mp.css" name="mp"></head>

<body bgcolor="#ff9c00" topmargin="2" marginheight="2" onload="loadimages()">
<center>
<!--the to bar table--><table cellspacing="0" cellpadding="0" border="0"><tr>

<td colspan="8"><img src="../images/main_page/fast.gif" width="544" height="43" border="0"></td>

<td rowspan="3"bgcolor="#ffb823"><img src="../images/main_page/right_links_wow.gif" width="13" height="71" border="0"></td>

<td rowspan="2"><img src="../images/main_page/logo.gif" width="174" height="61" border="0"></td>

<td rowspan="5" width="1" bgcolor="#FF7B2D"><img src="../images/trans.gif" width="1" height="1" border="0"></td>
</tr>
<tr background="../images/main_page/topbg.gif">
<td><img src="../images/main_page/left_links.gif" height="18" width="30" border="0"></td>
<td><a href="http://147.235.251.4/" onMouseover="on_imag(0)" onMouseout="off_imag(0)"><img src="../images/main_page/144_off.gif" border="0" name="image0" WIDTH="49" HEIGHT="18"></a></td>
<td><a href="../downloads/WOW_v442.exe" onMouseover=on_imag(2)" onMouseout="off_imag(2)"><img src="../images/main_page/personal_off.gif" border="0" name="image2" WIDTH="104" HEIGHT="18"></a></td>
<td><a href="http://www.bezeq.co.il" onMouseover="on_imag(4)" onMouseout="off_imag(4)"><img src="../images/main_page/bezeq_off.gif" border="0" name="image4" WIDTH="114" HEIGHT="18"></a></td>
<td><img src="../images/main_page/topbg.gif" width="1" height="18" border="0"></td>
<td><a href="../add/faq.asp" onMouseover="off_imag(8)" onMouseout="off_imag(8)">
<img src="../images/main_page/faq_off.gif" name="image8" width="101" height="18" border="0"></a></td>
<td>img src="../images/main_page/topbg.gif" width="75" height="18" border="0"></td>
<td><img src="../images/main_page/topbg.gif" width="70" height="18" border="0"></td>
```

FIG.3A

```
</tr><tr> <td colspan="8"><img src="../images/main_page/wow_top.gif" width="544"
heiht="10" border="0"></td>
<td><img src="../images/main_page/under_logo.gif" width="174" height="10"
border="0"></td>
</tr></table>
<table border="0" cellspacing="0" cellpadding="0" bgcolor="#ffb823"><tr>
<td rowspan="2" bgcolor="#FF7B2D" width="1" height="100%" valign="top">
<img src="../images/trans.gif" width="1" height="100%" border="0"></td>
<!--<td rowspan="2" width="21"><img src="images/trans.gif" width="21" height="1"
border="0"></td>background="images/main_page/wow.gif"-->
<td colspan=2 width="555" valign="top" align="right">
<!--main content start-->
<table align="middle" width="555" height="300" border="0" cellspacing="0"
cellpadding="0">
<tr><td><img src="../images/main_page/wow_bot.gif" width="100%" height="100%"
border="0"></td>
</table>
        </tr>
        </td width="174" align="right"valign="top">

<table cellspacing="0" cellpadding="0" border="0">
                </tr>

<td height="7"><img src="../images/trans.gif"
width="174" height="7" border="0" alt=" "></td>
                </tr>
                </tr>
                    <td height="7"><img
src="../images/main_page/internet.gif" width="174"
                                |
                                |
                                |
                                |
                                |
</td></tr>
<tr><td>

<img SRC="../images/addition/annonceADSL.gif" ALIGN="right"ALT="
announcement" border="0" WIDTH="600" HEIGHT="100">

<td></tr></table>
<body></html>
```

SYSTEM AND METHOD TO ACCELERATE CLIENT/SERVER INTERACTIONS USING PREDICTIVE REQUESTS

RELATED APPLICATIONS

This application claims priority of U.S. provisional patent application Ser. No. 60/183,818, filed Feb. 22, 2000; U.S. provisional patent application Ser. No. 60/194,050, filed Apr. 3, 2000; and U.S. provisional patent application Ser. No. 60/196,163, filed Apr. 11, 2000; each of which are hereby incorporated by reference in their entirety.

FIELD OF THE INVENTION

The present invention relates to the field of data communications. More specifically, the present invention relates to the enhancement of perceived data throughput in a server/client communications system.

BACKGROUND OF THE INVENTION

Data communications systems based on a dispersed client/server architecture have become prevalent over the last decade. The most notable and extensive of these dispersed client/server communications systems is the Internet. The World Wide Web (the "Web"), a series of applications introduced in the early-to-mid 1990's which allow layman Internet users to access information residing on servers at all points of the globe, has caused the volume of Internet data traffic to increase to unprecedented levels. The explosive growth in Internet data traffic, which seems to have outpaced the rate of expansion of the Internet's infrastructure, has produced bottlenecks along many of the Internet's data pathways. These bottlenecks intern cause delays in data flow between users and the servers with which they attempt to communicate.

SUMMARY OF THE PRESENT INVENTION

As part of the present invention, a Client Agent receives or intercepts a request for data from a client application running on a user's computer. The Client Agent may analyze the request and may forward the request to a server having the requested data or to a Predictive Server associated with the server. The Predictive Server may analyze the request and forwards the request to the server. A response by the server to the request may be intercepted either by the Predictive Server, the Client Agent, or both. Either the Client Agent or the Predictive Server may generate one or a series of predictive requests for data to the server based on the content of the server's response. A response by the server to a predictive request may be stored either at the Client Agent or at the Predictive Server, and may be transmitted to the client application when the client application transmits a request for the data contained in the response. In another mode of the invention the Client Agent causes the client to accelerate his requests. This mode can be used separately or in conjunction with other modes.

In the provisional patent applications (60/183,818; 60/194,050 and 60/196,163) the Client Agent is referred to a "Predictive Agent".

BRIEF DESCRIPTION OF THE DRAWINGS

The present invention will be understood and appreciated more fully from the following detailed description taken in conjunction with the appended drawings in which.

DETAIL DESCRIPTION OF THE INVENTION

The present invention is a system and method of enhancing perceived data throughput between a client application and a server containing data to be retrieved by the client. Predictive strategies implemented by intermediary elements such as a Client Agent and/or a Predictive Server, cause the server to transmit data likely to be requested by the client application, in advance of the client actually requesting the data or causes the client to accelerate his requests. The data may be stored either at the Client Agent or the Predictive Server, and is transmitted to the client application when a request for the data is actually transmitted by the client. Either the Client Agent or the Predictive Server may act as a predictive unit, that is, as a source of a predictive request. Either the Client Agent or the Predictive Server may act as a buffer unit, that is, as temporary storage for a server response.

Requests for data and responses thereto may be transmitted in data packets or other common data structures used in connection with a dispersed data network. TCP/IP and/or any other communication protocols may be used as part of the present invention. The data transmitted using the system and method of the present invention may be text, graphics, audio or video. Requests for data may be transmitted using Hyper Text Transfer Protocol ("HTTP") or any other data retrieval and exchange standard, currently known or yet to be devised.

Figure 1:
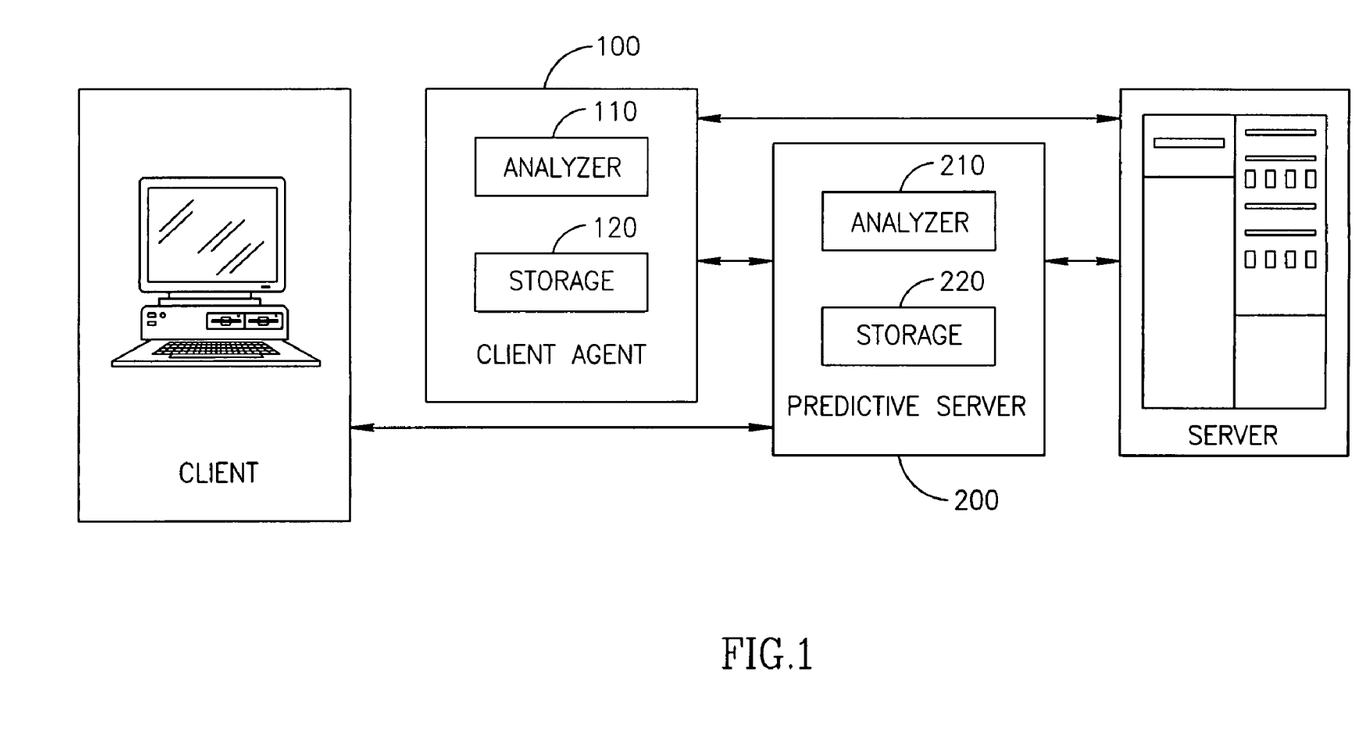
FIG. 1 is a diagram showing a Client Agent and a Predictive Server according to the present invention.

Turning now to FIG. 1, there is illustrated a system according to the present invention, wherein a Client Agent 100 and a Predictive Server 200 are located along a data pathway between a client and a server. Both the Client Agent 100 and the Predictive Server 200 have a storage unit, 120 and 220 respectively, and both have an analyzer unit 110 and 210 respectively.

The Client Agent 100 may be a software application residing on a computer in proximity with the computer where the client application is running, or even on the same computer as the client application. The Client Agent 100 may be an application also functioning as an Internet proxy for the client application.

The Predicative Server 200 may be an application running on a computer in proximity with the server, or even on the same computer as the server application.

A request for data from the server, generated by the client, may follow a path from the client, through the Client Agent 100 (path 1), through the Predictive Server 200 (path 2) and to the server (path 3). Alternatively, the request may follow a path skipping either the Client Agent 100 (path 4) or the Predictive Server 200 (path 5), but not both. Although the Client Agent 100 or the Predictive Server 200 may not be a recipient of a request generated by the client or a response generated by the server, either may intercept and analyze a copy of the communication. The Client Agent or Server may analyze data packets passing by using a method known as sniffing the line, or any other equivalent method, and intercept those packets having a destination address value related to either the client or the server.

A response from the server may follow a reverse path from that of the request evoking the response, or any other path illustrated in FIG. 1. Although a Client Agent 100 or the Predictive Server 200 may not be a recipient of a response generated by the server, either may intercept and analyze a copy of the request.

The transmission of a client's request or a server's response is regulated via the manipulation of source address and destination address values on the data packets comprising the data object, or by any other means presently known or not yet devised. For example, a data packet transmitted by a client and addressed to a server may be intercepted by either the Client Agent 100 or the Predictive Server 200, and re-addressed to have the destination address of a destination other than the server and a source address of the Agent, which intercepted the packet. Thus, altering the path of the packet. The routing and/or re-addressing of data packets between different points on a dispersed network are well known. The present invention functions with all known and not yet devised methods of routing and/or readdressing data packets.

The system and method of the present invention may take one of several embodiments and may be implemented according to one of several methodologies, examples of which are described below:

Mode One—Client Agent & Predictive Server

Figure 2:
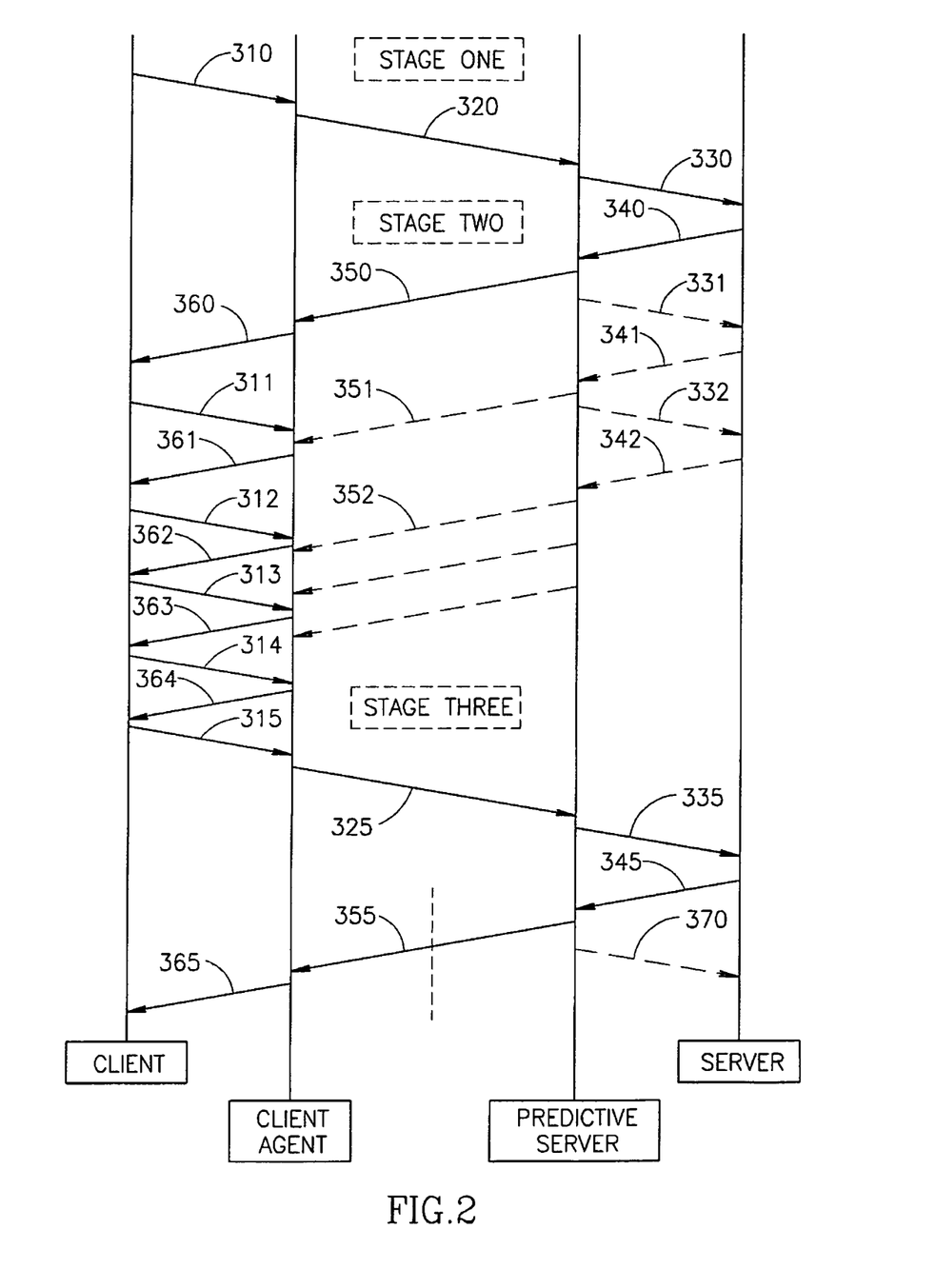
FIG. 2 is a data flow diagram illustrating a first mode of the present invention.

Turning now to FIG. 2, there is illustrated a data flow diagram for a first mode of the present invention where both a Client Agent 100 and a Predictive Server 200 are utilized. As part of the first mode of the present invention, a client's request for data 310 is received by the Client Agent 100, where a record of the request is made. The Client Agent 100 then forwards the request 320 to the Predictive Server 200, where a record of the request is also made. The Predictive Server 200 then forwards the request 330 to the server from which a response is expected. The above-mentioned steps may be collectively referred to as Stage 1, as shown in the FIG. 1.

Figure 3A:
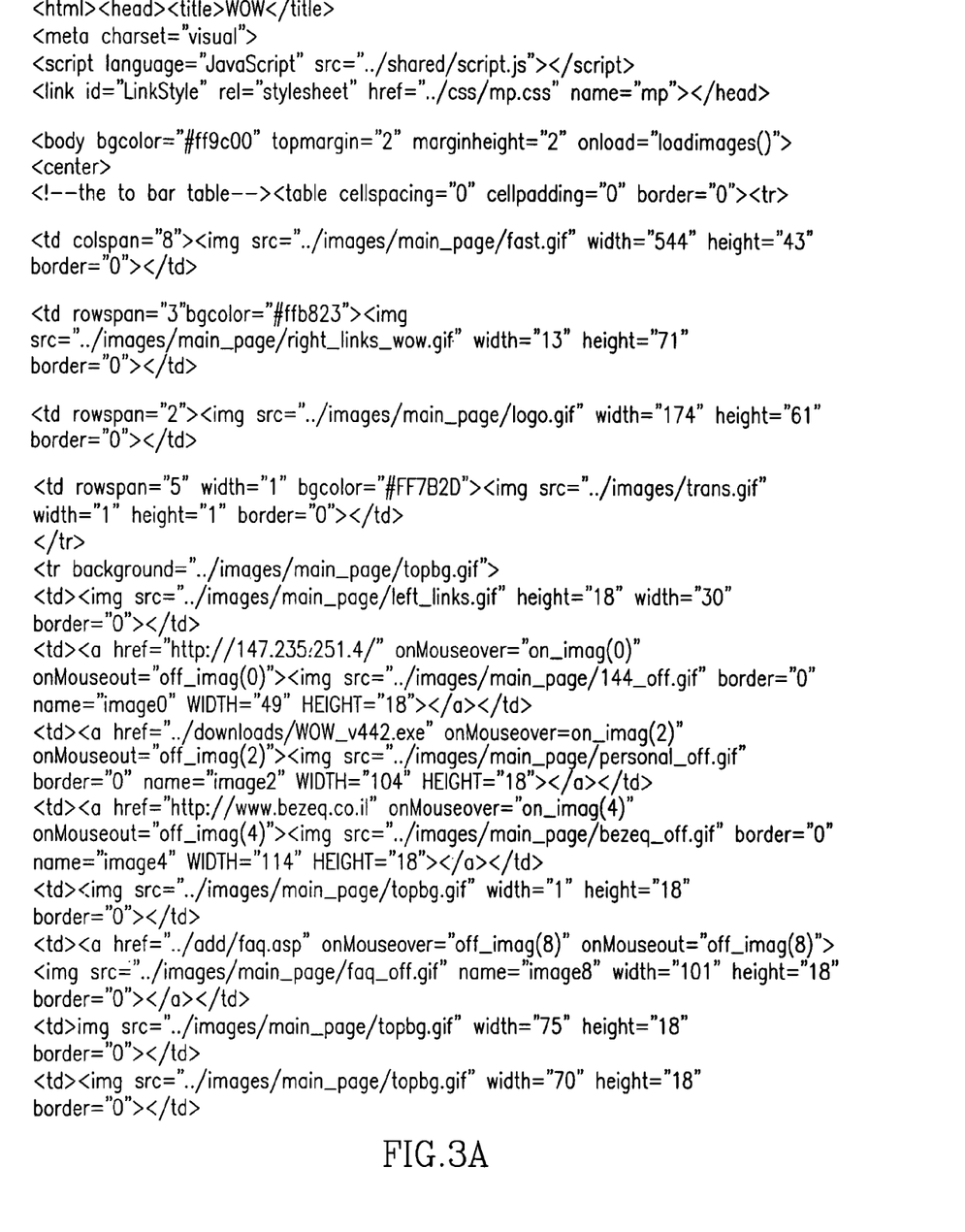
FIG. 3 shows a hyper-text-markup-language ("HTML") web page having URL's of the objects contained within the page.
Figure 3B:
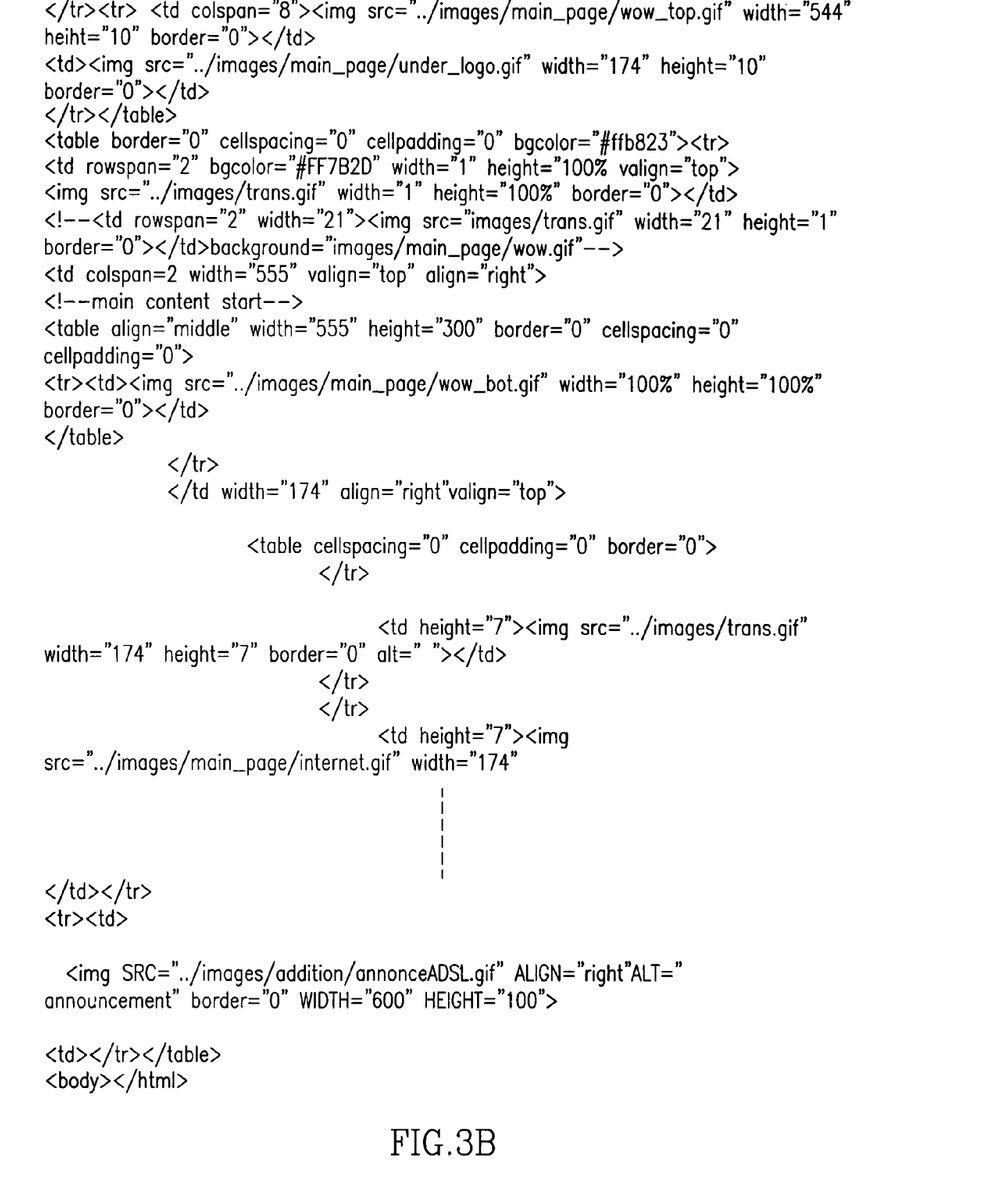

Stage 1 ends and Stage 2 begins upon the server's receipt of the client's request. After analyzing the request and assuming the server possesses in its storage device the requested data or web page, it generates and transmits a response 340 corresponding to the request. The server's response travels back through the Predictive Server 200, where it is analyzed to determine one or a series of possible subsequent requests the client may transmit. Typically, one of the first responses by a server to a client's request for a web page contains a list of objects present within the page, and instructions as to how to retrieve these objects from the server (e.g. the objects'URLs). The Predictive Server 200 may derive the series of possible future client requests and generate a "prediction list" based on the list of page objects in the response. FIG. 3 shows a hypertext-markup-language ("HTML") web page having URL's of the objects contained within the page. The Predictive Server 200 forwards the response 350 to the Client Agent 100 and issues one or a series of predictive requests 331, 332 . . . etc . . . , shown in FIG. 2 as dashed arrows, to the server. The predictive requests are based on the results of the analysis of the server's previous response. In the case where the original request is for a web page, the series of predictive requests will typically be URL's of the objects contained within the page.

In response to the predictive requests, the server may issue predictive responses 341, 342 . . . addressed to the Predictive Server 200. The Predicative Server 200 may automatically forward the predictive responses to the Client Agent 100, or the Predictive Server 200 may store the predictive responses in storage 220 and wait to receive a request from the Client Agent 100 for a specific response or set of responses before forwarding it. In the example of FIG. 2, when a Predictive Server 200 receives any response from the server, it automatically forwards the response to the Client Agent 100, in particular the first response 350 is immediately forwarded to the Client Agent.

Upon receiving the first response 350 from the Predictive Server 200, the Client Agent 100 forwards the response 360 to the client and generates its own "predictive list" by performing a similar analysis on the first response 350 to that which was performed by the Predictive Server 200 when the Predictive Server 200 generated its "predictive list".

The client, upon receiving a first response 360 from the server, compares the list of objects within the response against objects already stored locally, and issues a request 311 which it forwards to the Client Agent 100. The Predicative Agent 100 compares the request 311 against its own "predicative list" and against a list of already received predictive responses. If the predictive list does not have an entry for a predictive request corresponding to the client's request 311, the Client Agent 100 forwards the request along, as shown by arrow 325 in FIG. 2 and described herein below. If a predictive response corresponding to the requests 311, 312, 313, 314 and 315 is on the predictive list and has already arrived 351 and 352 at the Client Agent 100, the response is transmitted to the client, as shown by arrow 361, 362, 363 and 364. If a corresponding predictive request is on the list, but no corresponding predictive response has yet arrived at the Client Agent 100, the Client Agent 100 waits for the corresponding response to arrive and forwards it to the client upon receipt. Request 325 initiates stage three in FIG. 2, which is similar to stages one and two that are described above. In the Predictive Server 200 a record of the request 325 is made. The Predictive Server 200 then forwards the request 335 to the server from which a response is expected. The server's response 345 travels back through the Predictive Server 200, where it is analyzed to determine one or a series of possible subsequent requests the client may transmit. The Predictive Server 200 forwards the response 355 to the Client Agent 100 and issues one or a series of predictive requests 370. The Client Agent 100 forwards the response 365 to the client and generates its own "predictive list" and the process continues, as it is described above.

Figure 4:
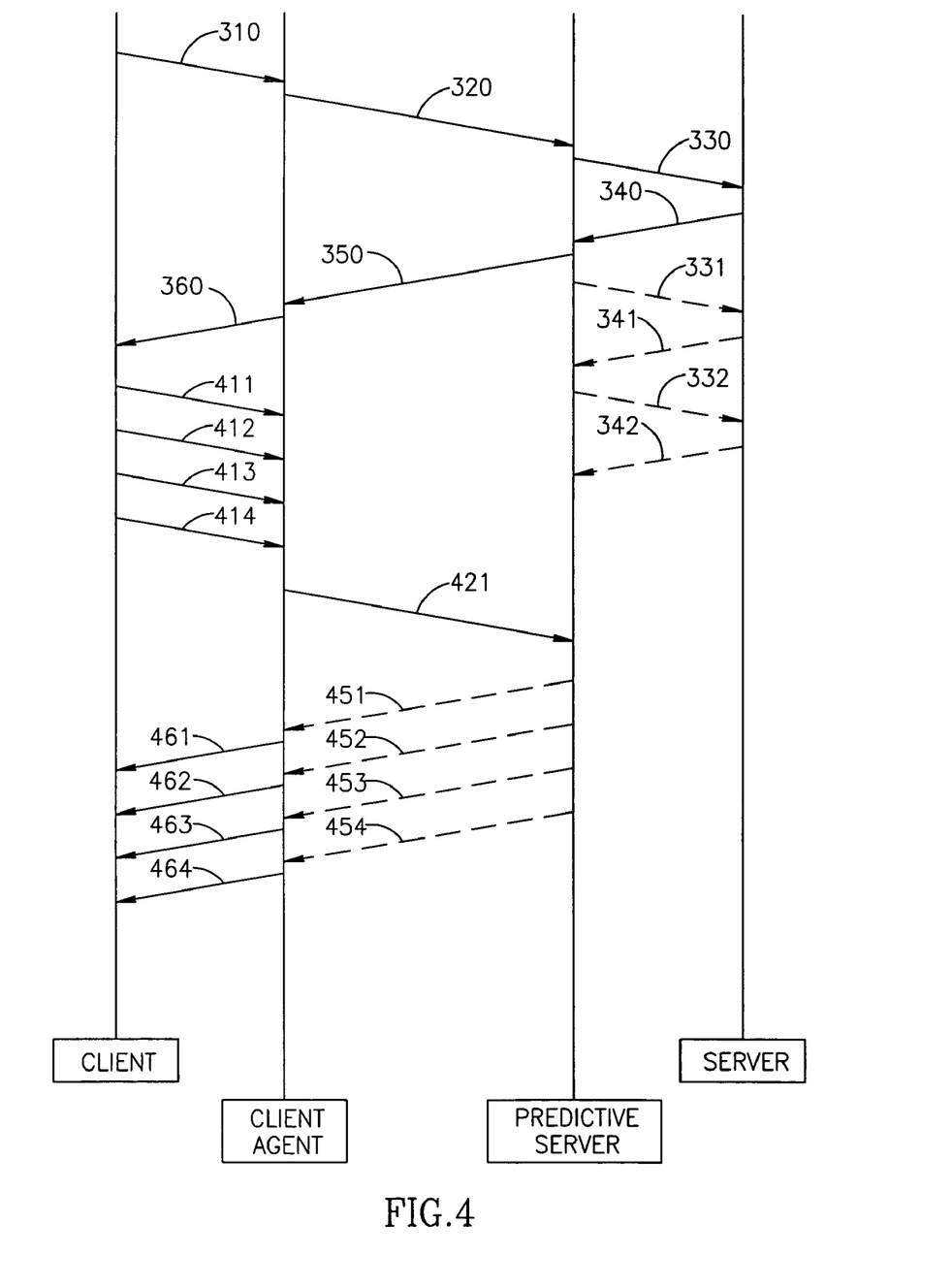
FIG. 4 is a diagram illustrating compression of data on the channel between a Client Agent and a Predictive Server.

FIG. 4 shows a mode of the present invention where the Predictive Server 200 does not automatically forward to Client Agent 100 predictive responses received from the server 341, 342, as shown in FIG. 2, but instead stores the predictive responses in storage 220 until a request 421 for the responses is received from the Client Agent 100. The client, upon receiving a first response 360 from the server, compares the list of objects within the response against objects already stored locally, and issues requests 411, 412, . . . 414 for only those objects not present locally. The client's set of issued requests 411, 412, . . . 414 may have fewer objects than contained in the response 360 when one or several of the objects listed in the response are already present locally at or near the client. The Predicative Agent 100 then forwards the set, or an equivalent representation of the set 421, to the Predictive Server 200. Thereby, the Predictive Server 200 only transmits those predictive responses 451, 452 . . . 454 not already present locally at the client. Upon receiving the responses, the Client Agent 100 transfers them to the client 461, 462 . . . 464.

As part of the present invention, the Client Agent 100 and the Predictive Server 200 may perform communication optimization techniques such as compression, protocol conversion, and partial information transfer on the connections (i.e. requests and responses) between the two. Many techniques and strategies are known and applicable to the present invention. For example, the Client Agent 100 may combine several client requests into one request packet or a series of packets, as shown in FIG. 4. Additionally, the Client Agent 100 may convert a request containing a complete Uniform Resource Locator ("URL") for an object into a smaller request with only a partial or relative URL. That is, the smaller URL contains only part of the instructions for retrieving an object from the server. However, because the Predictive Server 200 is able to identify the source of the smaller request, namely the client, and the Predictive Server 200 has a record of the last response received by the client, the Predictive Server 200 is able to convert a request with a partial URL back into one with a complete URL which is in a form acceptable to the server.

Responses to client requests, transmitted from the Predictive Server 200 to the Client Agent 100 may also be compressed by combining several responses into one or a series of packets. Various compression routines may be applied data flowing from the Predictive Server 200 to the Client Agent. Upon receipt of compressed data, the Client Agent may decompress the data and forward it to the client in its original form. Compression and decompression of data is well known, and any methods known today or yet to be devised may be applied as part of the present invention.

In an alternate embodiment of the present invention, the predictive responses are addressed directly to the Client Agent 100, thereby bypassing the Predictive Server 200. Each of the predictive requests sent by the Predictive Server 200 may contain a source address of the Client Agent 100. When a predictive request contains the source address of the Client Agent 100, the server's response to the predictive request, the predictive response, is addressed directly to the Client Agent 100.

The Client Agent's 100 "predictive list" of requests may be derived from the response, in the same manner as a list was derived by the Predictive Server 200, or the list may be a duplicate of the list produced by the Predictive Server 200. There are many well-known methods by which the Predictive Server 200 may transmit its prediction list to the Client Agent 100. The present invention may utilize any method or protocol of transmission, currently known or yet to be devised.

Mode Two—Client Agent

Figure 5:
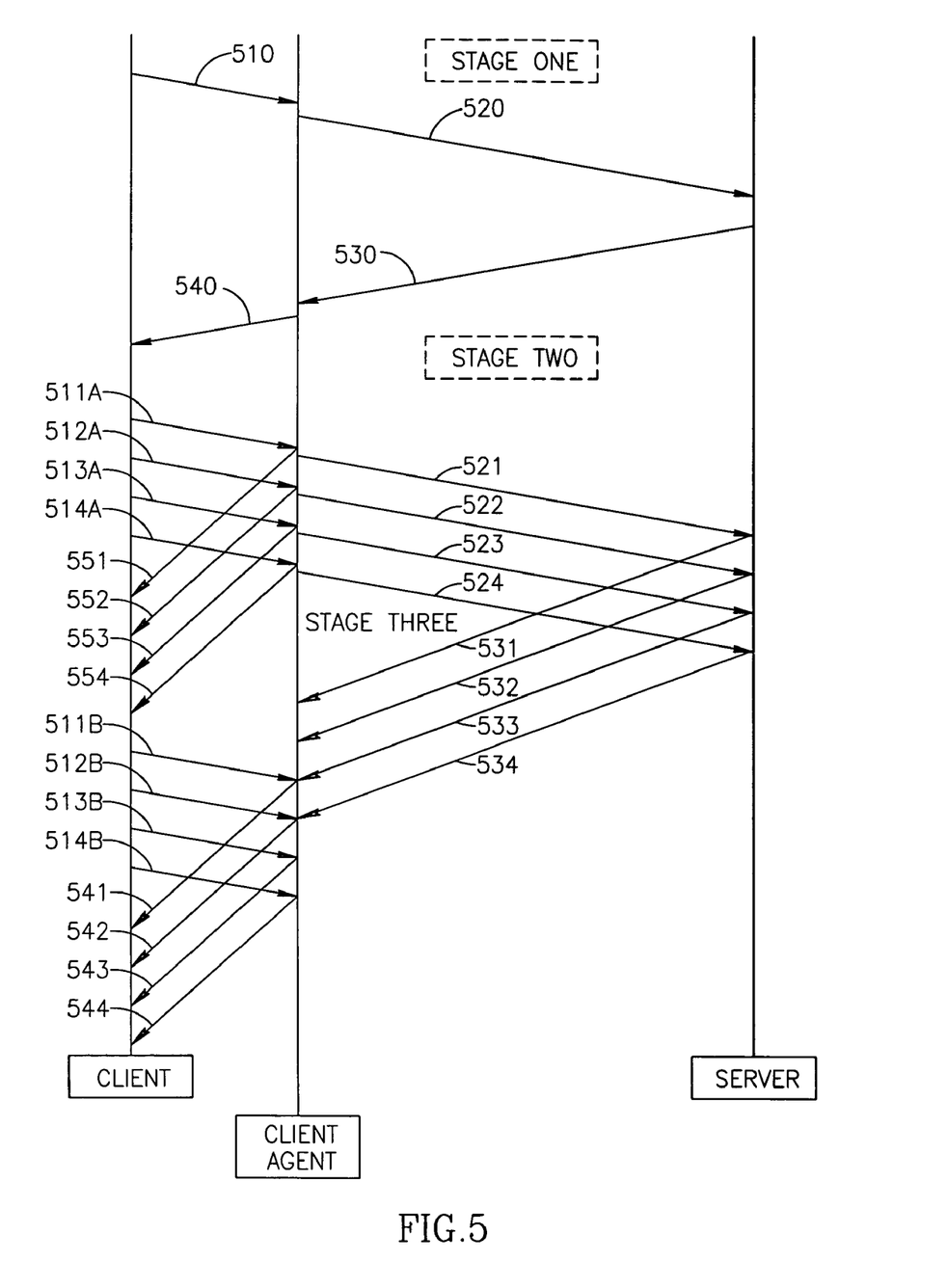
FIG. 5 is a data flow diagram illustrating a second mode of the present invention.

Turning now to FIG. 5, there is shown a data flow diagram for a mode of the present invention only utilizing a Client Agent 100. As part of the illustrated mode, a client's request 510 is received by a Client Agent 100 and sent 520 directly to a server. The server's response 530 to the request is intercepted by the Client Agent 100 and stripped of all information other than page formatting and the list of objects needed to be retrieved in order to complete the page, with a command to re-load all the objects after they are all retrieved, by using for example a Java Script. When the client receives this modified and stripped down version of the response 540, it checks against a list of locally stored objects to determine which objects need to be requested. The Client issues requests 511A, 512A . . . 514A for those objects not present locally. The Client Agent 100 forwards the request 521-524 to the server and responds to each of these requests with a pseudo or fake response 551-554 containing little or no data.

While the client is receiving pseudo responses to its requests, the server is sending real responses to the request 531-534 to the Client Agent 100. Once the client runs the reload script, the Client Agent 100 receives a new set of requests 511B-514B from the client. The new set is just a copy of the previous set 511A-514A, and the Client Agent 100 checks each incoming request for matching or corresponding response, which may have already arrived from the server. In the event a response has arrived, the Client Agent 100 forwards the response 541-544 to the client. If a corresponding response has not arrived, the Predictive Server waits and forwards the response to the client as soon as it is received.

This mode of the invention may be practiced utilizing only a Predictive Server 200 instead of a Client Agent 100.

Mode Three—Predictive Server

Figure 6:
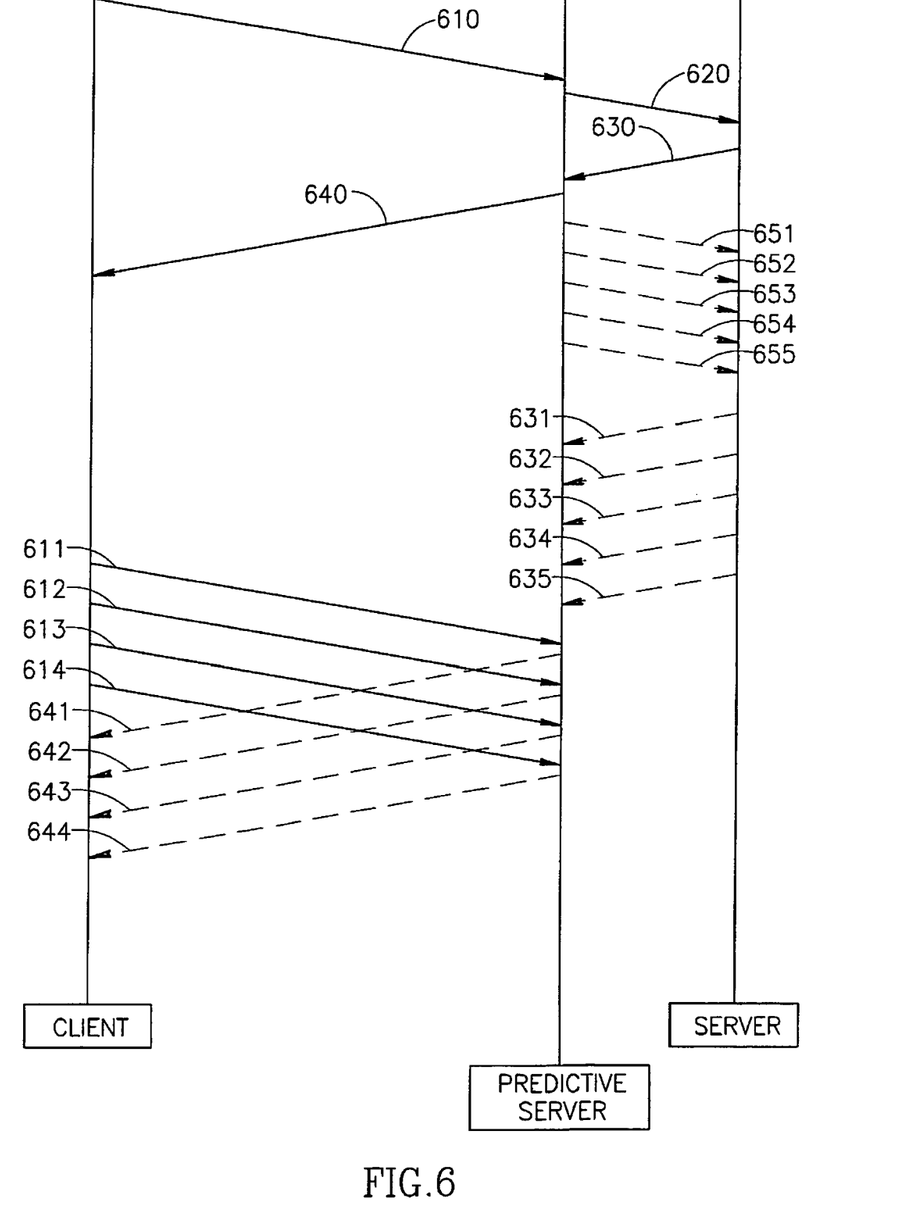
FIG. 6 is a data flow diagram illustrating a third mode of the present invention.

Turning now to FIG. 6, there is a data flow diagram illustrating data flow of mode of the present invention where only a Predictive Server 200 is used. As part of this mode request 610 from Client is transferred 620 to Server, which issues a first response 630. The Predictive Server generates or issues series of predictive requests 651-655 based on a server's first response 630. The first response 630 is forwarded to the client 640 which checks to see which of the objects listed in the response are present locally, and then the client issues requests 611-614 for those objects listed in the response but not present locally. The requests 611-614 are received by the Predictive Server 200 and corresponding responses are sent to the client as soon at they are received by the Predictive Server 200. Given that the Predictive Server 200 issued predictive requests 651-655 at about the same time as the original response 640 was forwarded to the client, many of the responses for the requests 611-614 issued by the client should already be received 631-635 and be stored at the Predictive Server 200 storage 220 prior to the receipt of the client's requests 611-614.therefore, Predictive Server 200 is able to respond immediately 641-644 to each such client's requests 611-614 respectively.

It is appreciated that one or more steps of any of the methods described herein may be implemented in a different order than that shown while not departing from the spirit and scope of the invention.

While the methods and apparatus disclosed herein may or may not have been described with reference to specific hardware or software, the methods and apparatus have been described in a manner sufficient to enable persons of ordinary skill in the art to readily adapt commercially available hardware and software as may be needed to reduce any of the embodiments of the present invention to practice without undue experimentation and using conventional techniques.

Those skilled in the art will appreciate that the present invention can be used in any client/server architecture, which architecture uses a systematic method in which the client retrieves data from the server (e.g. MS Exchange, Lotus Notes, SAP, . . . etc.).

While the present invention has been described with reference to a few specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed:

1. A system for enhancing perceived throughput between a client and a server, said system comprising:
   a predictive server in association with said server, wherein said predictive server comprises a server analyzer unit and a server storage unit; and
   a client agent in association with the client, wherein the client agent comprises an agent analyzer unit and an agent storage unit;

wherein the predictive server analyzes, at the predictive server analyzer unit, a first response that is received from said server acting on a request for a web page and, accordingly generates at the predictive server storage unit a predictive list of requests for objects which are needed for presenting the requested web page, and wherein the predictive server further issues predictive requests to the server, receives predictive responses from the server, and forwards the first response and the received predictive responses to the client agent; and wherein the client agent receives, with the agent analyzer unit of the client agent, via the predictive server, the first response, analyzes the first response, automatically forwards said first response to the client, receives from the client a request for an object contained in the first response and is needed for presenting the requested web page, compares the request for said object with the already received predicted responses, and when an already received corresponding predicted response exists, the existing predictive response is forwarded to the client.

2. The system of claim 1, wherein
the client agent further compares the request against an agent's predictive list which is generated based on the client agent analyzing the first response, and if no entry for that request for an object is found, the request is forwarded towards the server.

3. The system of claim 2, wherein said client agent receives requests from said client and forwards the requests to said predictive unit using encapsulation.

4. The system of claim 1, wherein data transmitted between said client agent and said predictive server undergoes a data processing step selected from a group consisting of data compression, partial information transfer, protocol conversion, and data packet combining.

5. The system of claim 1, wherein the client agent is adapted to transmit a fake response to a client before a real response from said server has been received.

6. A method for enhancing perceived throughput for the delivery of a requested web page between a server and a client, said method utilizing a predictive server and a client agent, said method comprising:
analyzing a first response of the server as a result of a request issued by the client for the requested web page;
generating a list of predictive requests for objects needed for presenting the requested web page based on the content of the first response;
sending the list of predictive requests toward the server;
the predictive server automatically transferring the first response toward the client by means of the client agent;
receiving at the predictive server, predictive responses from said server;
sending with the predictive server the predictive responses toward the client agent;
the client receiving the first response and issuing a first request for an object contained within the first response and is needed for presenting the requested web page, the first request is forwarded to the client agent; and
the client agent comparing the first request to the received predictive responses and, if a corresponding predictive response exists, the existing predictive response is forwarded to the client.

7. The method according to claim 6, further comprising by the client agent:
generating a client agent predictive list; and
comparing received requests for objects with objects listed in the client agent predictive list and if no entry for that object is in said client agent predictive list the client agent forwarding the request to the server.

8. The method according to claim 6, wherein the client agent receives the response to one of the one or more predictive requests after said client agent forwards the client's request for reload to said predictive server.

9. The method according to claim 6, wherein said predictive server receives multiple predictive responses, encapsulates the multiple predictive responses and forwards the encapsulated responses to the client agent.

10. The method of claim 9, wherein data transmitted between said client agent and said predictive server undergoes a data processing step selected from a group consisting of data compression, partial information transfer, protocol conversion, and data packet combining.

11. The method of claim 6, wherein the client agent unit transmits fake responses to a client.

12. The system of claim 1, wherein said client agent is further capable of issuing a re-load command.

* * * * *